Patented July 17, 1951

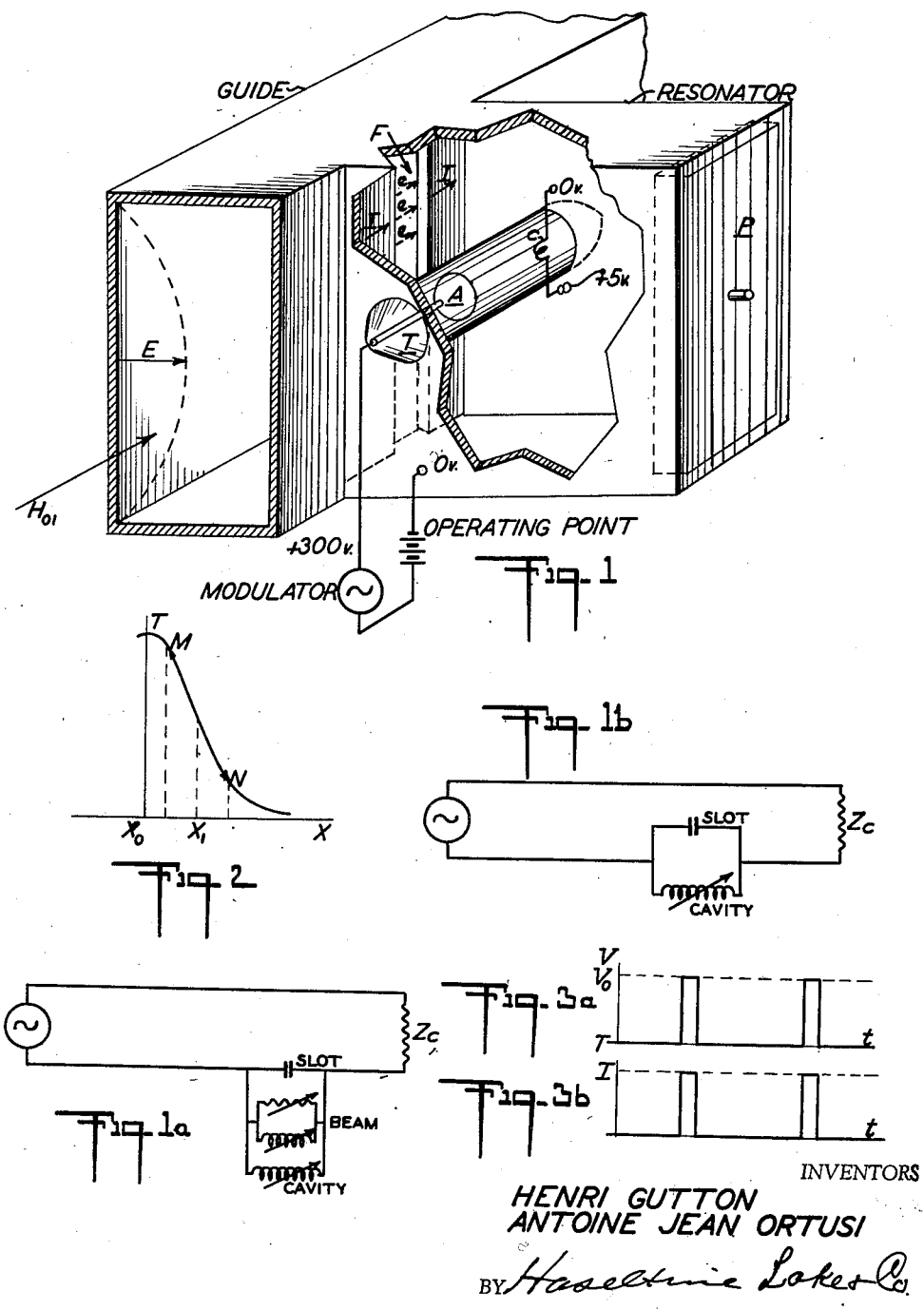

2,560,859

UNITED STATES PATENT OFFICE 2,560,859

METHOD FOR MODULATING THE HIGH-FREQUENCY ENERGY TRANSMITTED IN HOLLOW DIELECTRIC GUIDES

Henri Gutton and Antoine Jean Ortusi, Paris, France, assignors to Compagnie Generale de Telegraphie Sans Fil, a corporation of France Application April 11, 1947, Serial No. 740,842
In France March 2, 1944

Section 1, Public Law 690, August 8, 1946
Patent expires March 2, 1964

6 Claims. (Cl. 332—58)

This invention relates to method and apparatus for modulating high frequency energy, more particularly that energy transmitted in a hollow dielectric wave guide.

An object of the invention is to produce said method and apparatus which shall be able to effect said modulation in amplitude without inertia, and without appreciable energy loss, and over a relatively wide frequency band.

In accordance with the principle of this invention, use is made of an associated cavity resonator, the tuning of which together with that of its coupling, under control of the modulating energy, in turn controls energy transmission in the wave guide. In this particular application, the resonator is externally related to the guide, and the coupling between the wave guide and the resonator may be of any suitable character, such, for example, as a slot in one of the side walls of the guide.

The control of the tuning may be effected by an electronic discharge, more particularly a beam, traversing the resonator cavity, the anode-cathode voltage of which is controlled by the modulating source. Preferably, but not necessarily, this beam is directed so as to be parallel to the electric field of the coupling slot.

The foregoing outline of the invention principle and the invention itself will be better understood from the following description of certain embodiments thereof taken in connection with the accompanying drawing wherein:

Figure 1 is a perspective view partly in section of a wave guide with a cavity resonator coupled thereto through a lateral slot;

Figures 1a and 1b are diagrams of equivalent electric circuits based on the parameters of the resonator and coupling, illustrating the beam effects;

Figure 2 shows a graph illustrating the modulating effect; and

Figures 3a and 3b are graphs illustrating the abrupt modulation effect.

Referring to Figure 1 illustrating non-limitatively an embodiment of the invention, there is designated by "resonator" the lateral cavity resonator on the side of the guide, which resonator modulates the H$_{01}$ wave traversing the rectangular transmission guide. It is shown as coupled to the guide by the slot F formed in a lateral wall of the guide. In this figure, the cavity resonator is represented as being added directly to the guide. In practice, for convenience of adjustment, it is usually coupled to the guide by conventional coaxial devices. The resonator is closed by a movable piston P. It is traversed perpendicularly to the slot by an electronic discharge tube T comprising an anode A and an emitting filament C between which there is formed an electronic beam. The anode-cathode circuit contains in series an anode voltage source and the modulator producing the modulating voltage. The return circuit is closed by the conductive wall of the resonator. According to a particular case, especially when the modulator is capable of providing a voltage carrying the beam to its maximum, the anode source can be omitted. In general, however, such anode source is utilized for determining the operational point on the curve as shown in Figure 2. In case of an all-or-nothing modulation, the modulator is replaced by an interrupter applying voltage to the tube and causing the beam to appear suddenly, or breaking the anode circuit and causing the beam to disappear, as shown in Figures 3a and 3b.

The operation of the apparatus is as follows. In the absence of the beam, the resonator is adjusted by the piston P so that the combination of cavity resonator and coupling slot is tuned on the wave in the guide. In the case represented by the wave H$_{01}$ in the rectangular guide, the electric field distribution is designated by E. It gives rise to a conductive current I in the wall which at the location of the slot transforms it into a capacitive current comparable to a field e across the slot. This slot behaves as a capacity in parallel to the cavity resonator which latter in this case can be considered as an inductive reactance variable by the piston. The equivalent circuit of the combination is represented in Figure 1b. The combination slot-cavity resonator forms a resonant circuit in series in the guide fed by the ultra high frequency wave generator and outputting into a characteristic terminating impedance Z$_c$. In case of resonance with the wave of the guide, this trap circuit stops transmission. The electronic beam, which like any current radiates an electro-magnetic field in space, behaves in the case represented as a self-inductance and resistance at the same time, whose value is variable with the function of the field intensity. When added to the resonant circuit of Figure 1b, these parameters disadjust it and consequently detune it respecting the transmitted wave in accordance with the diagram of Figure 1a.

The anode battery is adjusted so as to choose the proper operating point on the transmission curve of Figure 2. The effect of the modulator acting on the intensity of the beam causes the transmission to vary from M to N around the medium point $x_1$.

If the voltage V$_0$ is applied under the form of

"pips" as is shown in Figure 3a, the transmission is made also under the form of identical "pips" as shown in Fig. 3b. Now, the production of "pips" of any duration and interval on a continuous voltage is an easy problem. It results that the same problem is solved for the transmission of decimetric waves.

In order to have a system enabling the blocking of reception during the emission of a pip, in a device for detecting obstacles, it is sufficient to dispose a resonator coupled to the exterior of the guide of the receiving system, substantially in the manner shown in Figure 1. This resonator is assumed to be tuned when a voltage $V_0$ is applied to the terminals of the cathode ray tube and de-tuned in the reverse case. It is then sufficient to regulate the voltage $V_0$ at the rate of the pips of transmission for automatically blocking the reception for the duration of the transmission or, conversely, for receiving it integrally during the other intervals of time.

It is to be noted that the cavity resonator as shown is coupled to the guide by a slot in the large side of the guide and that the electronic beam is directed parallel to the field in the slot. If the resonator had been coupled by a slot in the small side of the guide, this slot would play the role of an inductance and the resonator, that of a capacity. The electronic beam, if it is parallel to the slot, would play the role of a capacity combined with a resistance.

In making the foregoing disclosure of the invention, electric diagrams of conditions of resonance and lack of resonance have been utilized by considering the ultra high frequency electric parameters of the resonator and of the slot. The same result may be arrived at by resorting to the explanatory idea of phase of the reflected wave. In fact, a slot behaves like a discontinuity in the guide which produces a reflection. The resonator cavity produces another reflection toward the slot, which is a function of the physical properties and particularly the dimensions of the resonator. By adjusting the position of the piston, there can be given to the wave reflected by the resonator at the location of the slot, a phase opposed to that of the wave reflected by the slot. The annulling of the wave as a result is equivalent to the condition of resonance.

What we claim is:

1. A device for modulating ultra-high frequency energy transmitted in a hollow dielectric guide comprising a source of production of the energy, a cavity resonator arranged outside the guide and means by which it is coupled laterally to the wall thereof, an electronic beam tube comprising an anode and a cathode arranged across said cavity in such manner that the electronic beam produced in said tube is directed according to the electrical field of the ultra high frequency wave in said cavity resonator, and means connected to said tube for varying in accordance with modulating signal energy the potential supplied to said anode and cathode.

2. A device for modulating ultra-high frequency energy transmitted in a hollow dielectric guide comprising a source of production of the energy, a cavity resonator arranged outside the guide and means by which it is coupled laterally thereto comprising a slot provided in the wall of the guide, a tube comprising an anode and a cathode arranged across said cavity of the resonator in such manner that the electronic beam produced in said tube is directed according to the electrical field of the ultra high frequency wave in said cavity, and means connected to said tube for varying the potential supplied to said anode and cathode in accordance with modulating signal energy.

3. In a wave transmission system having a wave guide traversed by ultra high frequency waves of predetermined length, and a cavity resonator with means coupling it laterally to said guide comprising a slot in a side wall of said guide, the method of amplitude modulating said waves, comprising tuning the combination of said resonator and its coupling to the wave length of said waves, and de-tuning said combination as a function of the signal modulating energy by producing in the interior of said resonator an electronic flux varying in accordance with the energy of said signal.

4. The method according to claim 3, wherein the producing of the varying electronic flux comprises traversing the cavity of the resonator by an electronic beam and causing its intensity to be varied by said signal energy.

5. A transmission system for amplitude modulated ultra short waves, comprising a wave guide traversed by the energy of said waves of predetermined wave-length, a cavity resonator mounted on the outside of said guide and electrically coupled thereto by a slot formed in a side wall of said guide, means for adjusting the tuning of said cavity resonator, means for producing an electronic discharge through its cavity, and a source of modulating signals coupled to said last mentioned means so as to cause the electronic discharge to vary.

6. A system according to claim 5, wherein the means for producing said electronic discharge includes means for producing an electronic beam traversing the cavity, and wherein the said means for varying the discharge includes a source of modulating voltage connected in series with said beam so as to vary its intensity.

HENRI GUTTON.
ANTOINE JEAN ORTUSI.

REFERENCES CITED

The following references are of record in the file of this patent:

UNITED STATES PATENTS

| Number | Name | Date |
|---|---|---|
| 2,078,302 | Wolff | Apr. 27, 1937 |
| 2,155,508 | Schelkunoff | Apr. 25, 1939 |
| 2,301,163 | Koch | Nov. 3, 1942 |
| 2,338,237 | Fremlin | Jan. 4, 1944 |
| 2,396,044 | Fox | Mar. 5, 1946 |
| 2,407,274 | Hartley et al. | Sept. 10, 1946 |
| 2,408,425 | Jenks et al. | Oct. 1, 1946 |
| 2,426,992 | Folland et al. | Sept. 9, 1947 |
| 2,438,954 | Townes | Apr. 6, 1948 |
| 2,434,917 | Fuchs | June 27, 1948 |
| 2,485,029 | Bradley | Oct. 18, 1949 |